United States Patent [19]
Doughty et al.

[11] 3,843,305
[45] Oct. 22, 1974

[54] DOUBLE PARISON DIE HEAD CONTROL MECHANISM

[75] Inventors: Robert L. Doughty, West Hartford; Clayton A. Wheeler, Plainville, both of Conn.

[73] Assignee: Monsanto Company, St. Louis, Mo.

[22] Filed: July 5, 1973

[21] Appl. No.: 376,533

Related U.S. Application Data

[62] Division of Ser. No. 223,269, Feb. 3, 1972, Pat. No. 3,767,345.

[52] U.S. Cl.......... 425/465, 425/381, 425/DIG. 206
[51] Int. Cl.............................................. B29d 23/04
[58] Field of Search........ 425/326 B, 341, 381, 382, 425/387 B, DIG. 206, DIG. 211, 465

[56] References Cited
UNITED STATES PATENTS

| | | | |
|---|---|---|---|
| 2,632,202 | 3/1953 | Haines | 264/98 |
| 3,019,481 | 2/1962 | Negoro | 425/326 B |
| 3,390,430 | 7/1968 | Lynch et al. | 425/326 B |
| 3,564,653 | 2/1971 | Sparks et al. | 425/381 X |

Primary Examiner—Al Lawrence Smith
Assistant Examiner—K. J. Ramsey
Attorney, Agent, or Firm—Michael J. Murphy

[57] ABSTRACT

Torque equalizing mechanism for uniformly actuating the die cores of a double parison extrusion head on a vertical "wheel-type" blow-molding machine and uniformly varying the wall thickness of a pair of parisons simultaneously extruded from the head. A single programming means governs operation of the actuating mechanism. Die cores, extending upwardly from the double extrusion head, are engaged by rocker arms fixed on a rotatably mounted tubular shaft section of a composite shaft having a driver rod fixed internally thereof at a localized central attachment area equidistant from the die core centers. The rod extends from one end of the tube and a crank arm on the outer end of the rod is linked to a control shaft movable in response to the single programming means. The composite tubular shaft arrangement applies motion to the die cores equally and requires a minimum of head space for a double parison die head, thus facilitating the conversion of existing single parison machine designs to double the output thereof.

5 Claims, 5 Drawing Figures

3,843,305

DOUBLE PARISON DIE HEAD CONTROL MECHANISM

This application is a division of application Ser. No. 223,269, filed Feb. 3, 1972, now U.S. Pat. No. 3,767,345.

DISCLOSURE OF THE INVENTION

This invention relates to double parison extrusion head assemblies and to an actuating mechanism for controlling, from a single programming means, the die core members of identical parison outlets. The invention has special reference to a double extrusion head assembly for vertical blow-molding apparatus of the wheel type which is characterized by radially moving mold parts for receiving parisons at a charging station.

The wheel type of blow molding machine used for high volume production of plastic bottles and the like is well known and includes a series of mold units circumferentially spaced about a rotating hub member and radially extending therefrom as "spokes" of a wheel. This type of machine, essentially as disclosed, for example, by U.S. Pat. No. 2,784,452 granted Mar. 12, 1957, operates to successively advance each of the radially disposed mold units in a revolving path past an extrusion die head to a loading position where the mold halves are closed on parisons extruded by the head; to a "blowing" station where the now enclosed parison is inflated to conform to the shape of the closed mold cavity; and then to an ejection station where the mold halves are opened and the formed article is ejected, the radially separated mold halves thereafter being advanced for return to the charging station.

The mold units each comprise a stationary mold member fixed adjacent the rotating hub and a radially movable mold member mounted for inward closing and outward opening movement under the control of cam followers associated with the movable mold half and engaging fixed cam surfaces.

At the charging station a parison extrusion head is supported at the end of an extruder barrel connection mounted adjacent the wheel. The head extends at right angles to the plane of wheel rotation and is positioned so that the axis of the parison outlet or orifice is vertically disposed above the mating mold cavity portions when the latter are being moved together in the charging operation. The mold halves of a typical machine are closed at about a three o'clock position of wheel rotation from a position of maximum radial separation at about a one o'clock position. In passing from the fully open to the closed position cam operated mechanism moves the outer mold half radially inwardly to enclose a parison tube in the completely closed mold immediately below the extruder outlet. The arcuate travel of the inner stationary mold half is such as to clear the adjacent side wall of the die head, the head being fixed in relatively closely spaced relation to the revolving inner mold portions between the one and three o'clock positions. Inward travel of the revolving outer and movable mold half is guided by the cam mechanism to clear the top and outer side walls of the stationary head before bringing the halves completely together.

As will be recognized the full extent to which the outer mold unit must be radially separated in this type of machine is largely determined by the transverse cross-sectional configuration of the extrusion die head block and particularly by the head-space requirements imposed by die core actuator elements on the top of the block. Such actuator elements, as is also well known, are for varying the wall thickness of a parison along its axial length for the efficient distribution of material in a finished article. The die cores effect changes in wall thickness by regulating the annular size and characteristics of the parison outlet orifice through a programmed raising and lowering of a mandrel tip at the orifice.

On wheel type machines for single parison production, actuators of different types have been used to raise and lower the single core on the top of a head without requiring more than a nominal amount of head space. However, when the single parison head of a wheel-type machine is replaced by a double parison head and each mold half unit is designed with a pair of cavities, it has been found impractical to adapt existing double parison die core actuating equipment for use therewith, one of the major drawbacks being an undesirable increase in the above mentioned head space requirements.

Accordingly, a major object of the present invention is to provide a unique die core actuating mechanism with low head-space requirements and operation by a single programming means to control in a uniform manner the two die core members of a pair of duplicate parison outlets. Thus, the conversion of existing single head machinery is facilitated as well as the design of new equipment for simultaneously blow molding duplicate articles.

Another object of the invention, more specifically, is to provide a single composite rocket shaft assembly for actuating the spaced die core members of a double parison head and an arrangement by which an equal amount of torque is applied to each die core, the turning force for rocking the shaft being applied by a crank arm at the extreme outer end thereof and linked to a single programming means outside the path of wheel rotation.

SUMMARY OF THE INVENTION

The present invention is practiced by providing, on a double parison extrusion head having its die core members extending upwardly of the top wall thereof, a horizontally disposed tubular shaft section rotatably journaled on the head laterally of the die cores and on an axis parallel to a vertical plane passing through the die core centers. Fixed on the tubular shaft opposite the exposed die core ends are actuating lever arms interengaged with said ends to impart vertical axial movement thereto on rotation of the tubular shaft. Internally of the tubular shaft and in a localized area centrally positioned with respect to the lever arms and die core centers, an inner end portion of a driving rod section is fixed. The rod extends from the tube shaft outwardly towards the supported end of the extrusion head and is journaled in a bearing block on the head. Beyond the bearing and on the end of the rod a crank lever arm is fixed. The arm is pivotally linked to a reciprocable control shaft, the movement of which is governed by any suitable programming control means.

Rotary movement applied to the internally fixed driver rod is in turn applied to the tubular shaft at the localized central area thereof midway between the die core centers. The actuating lever arms engaging each die core are spaced equally from said central attached area and thus the forces transmitted to raise and lower each die core are identical in value and result in equally uniform variations in the wall thickness of the simultaneously extruded parison tubes.

The particular objects and advantages of the present invention will be appreciated from the following detailed description of a preferred embodiment thereof as disclosed in the accompanying drawings.

FIGURES

DESCRIPTION OF THE INVENTION

Figure 1:
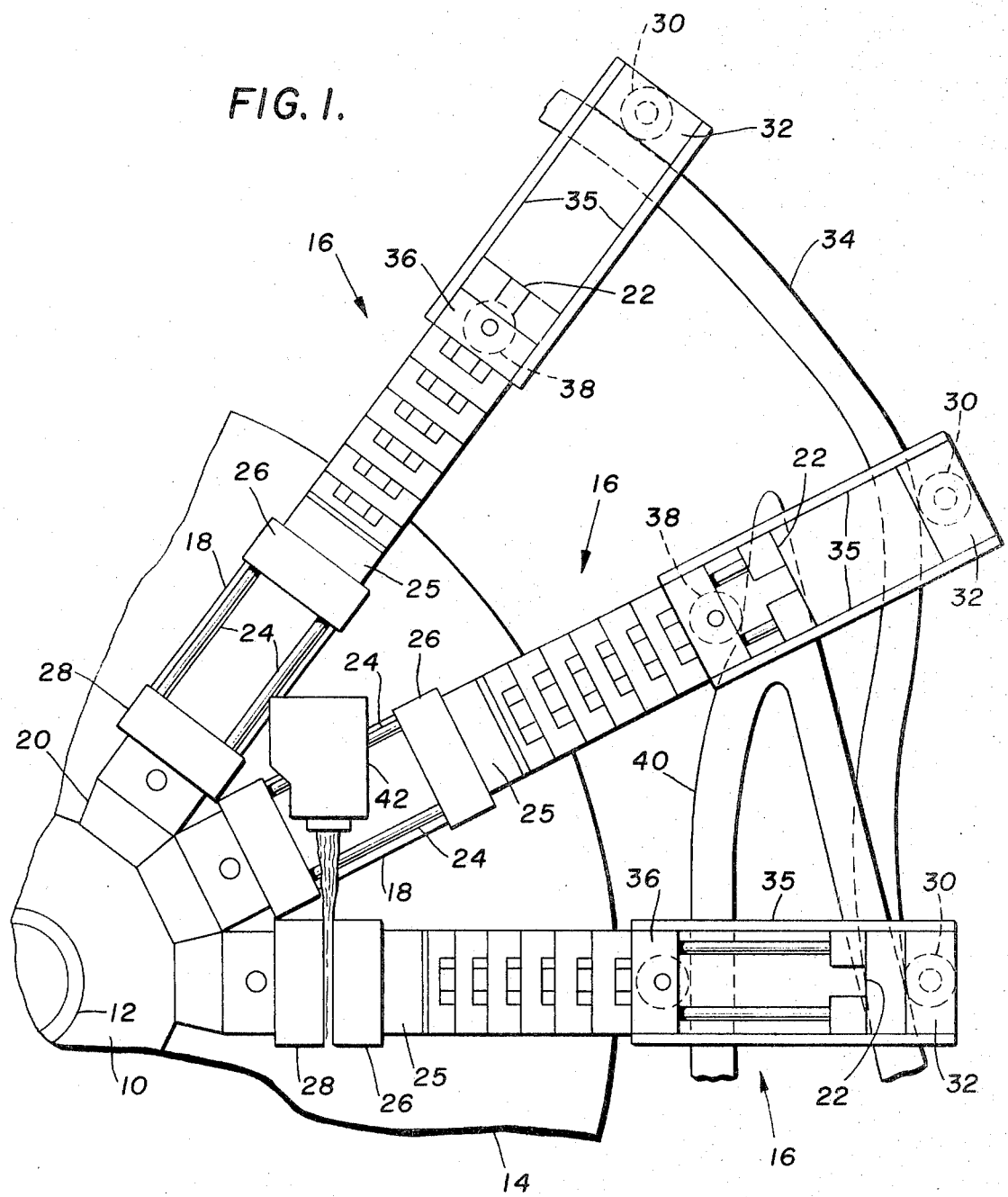
FIG. 1 is a fragmentary portion of a vertical wheel-type blow-molding machine showing the "charging" station area thereof and illustrating the closing action of the separable mold units with respect to a stationary extrusion head.

In FIG. 1 a portion comprising the "charging station" section of a typical wheel-type blow-molding machine is schematically shown. In this area of the machine the mold units carried on each "spoke" of the vertically disposed wheel, revolving clockwise, are operated by conventional mechanism to hold the mold halves at a position of maximum radial separation prior to rotation past the stationary parison extrusion head, and, while moving by the head, to progressively bring the outer mold half inwardly into a closely spaced relation to the inner fixed half and receive an extruded parison tube between them. As soon as the mold is "charged" the halves are immediately clamped together for subsequent blowing operations etc. as is well understood.

In FIG. 1 the hub of the wheel is indicated at 10 on a horizontal rotating shaft 12. Hub 10 carries a circular plate 14 on which the "spokes" of the wheel are radially supported. Each "spoke", generally indicated by numeral 16, is suitably fixed to plate 14 and comprises essentially as shown, a radially directed support plate 18 having an inner end at 20 and an outer end at 22 spaced outwardly of plate 14. Fixed between ends 20 and 22 are a pair of parallel rods 24, the rods serving to guide a movable outer mold half at 26 for radial movement to and from open and closed condition with respect to an inner mold half 28 fixed adjacent the hub. Slidably mounted on parallel rods 24 is an outer mold holder block 25 to which outer mold half 26 is secured in conventional manner. Block 25 is at the inner end of a radially movable assembly extending outwardly thereof for effecting mold opening and closing movements. A mold opening roller 30 is carried by an outer actuating block 32 and cooperates with a fixed cam having a mold opening surface 34. Inwardly spaced from block 32 and joined by side strap members 35 is an inner actuating block 36 carrying a mold closing roller 38 to cooperate with a fixed cam surface 40. Conventional spacers are mounted between the blocks 36 and 25 for adjustably setting the positional relationship of an outer mold half 26.

As will be apparent outer roller 30 engages the fixed cam surface 34 for controlling opening movement of the mold half 26. Inner roller 38 engages the surface of fixed cam 40 for the inward closing movement of mold half 26. On the wheel "spoke" at the one o'clock position as in FIG. 1 the mold halves are separated to their maximum extent. At the two o'clock position the outer mold half 26 has been moved inwardly towards closed position by initial engagement of closing roller 34 and cam surface 40. At the three o'clock position the mold halves are closed with a parison charge contained in the completed mold cavity.

The wheel-type machine and operation thereof as briefly outlined is well known and exemplified, as previously mentioned, by prior U.S. Pat. No. 2,784,452. Machines of this general type have been widely used with a single parison extrusion head fixed in the same relative position indicated by the outline of a head at 42. The head is normally equipped at the top thereof with die core actuating mechanism controlled by programmed means for imparting desired variations in the wall thickness of the extruded tube. The die core member is disposed for vertical movement in the die head and is provided with a mandrel tip at its lower end to regulate the flow characteristics at the orifice outlet and form a desired tube wall configuration by raising and lowering the tip. The upper end of a die core extends from the top wall of the head and actuating means is operatively connected thereto.

Further considering the relative positions of the outer mold half 26 at the one and two o'clock positions, respectively, it is apparent that the outer mold half 26 must be carried in an arcuately curved path which will clear the top and outer side wall of the stationary head 42. Low head-space requirements for a head block thus contribute to a smoother operation in such closing movement. Single extrusion heads and mechanism to actuate a single die core create little if any problem of head space. However, since the outlets for a double parison extrusion head are necessarily positioned one behind the other as viewed in FIG. 1, and since both die core members must be operated with precise uniformity to produce "identical twin" parison tubes, the conversion of a single head machine for double parison production and with a minimum of alteration gives rise to the need for effecting an identical and precise operation of both die cores by mechanism which requires no greater head space than that occupied by the single parison heads. Apparatus accomplishing this purpose and embodying the present invention is illustrated by FIGS. 2–5 which will now be described.

Figure 2:
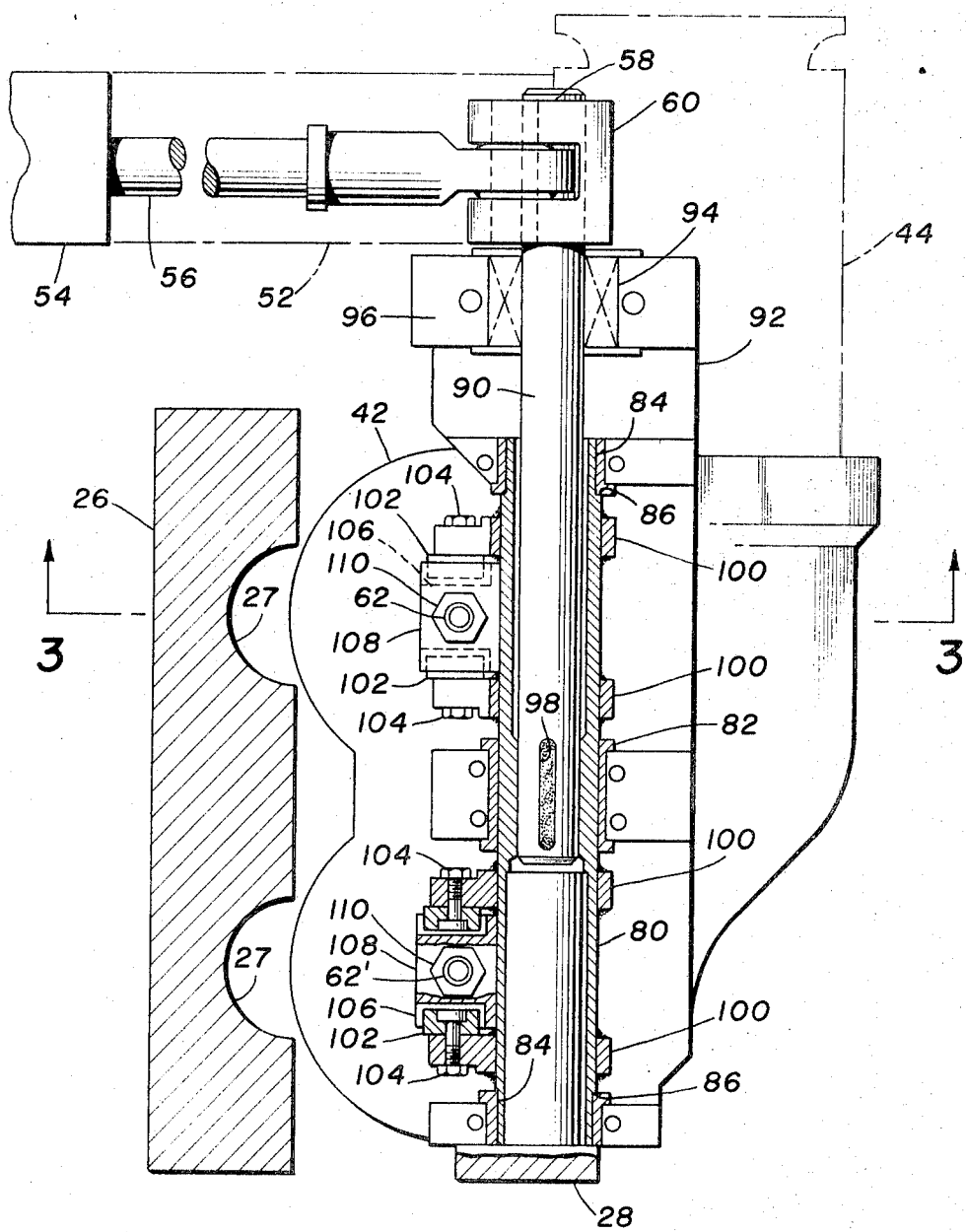
FIG. 2 is a top plan view of a double parison extrusion head block having a torque equalizer shaft assembly embodying the present invention mounted thereon with parts shown in section.
Figure 3:
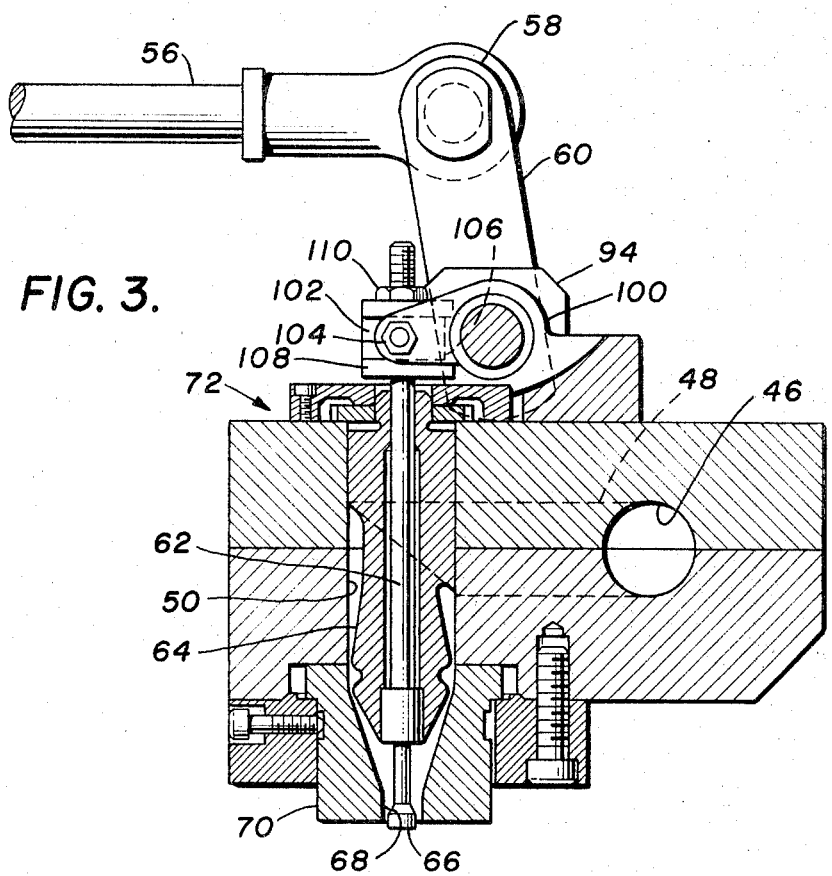
FIG. 3 is a vertical section as on line 3—3 of FIG. 2 through one of the parison outlet chambers.

In FIG. 2 the mechanism is shown in top plan, being fixed on the top wall of a double parison extrusion die head 42. The input end of the assembly is shown at the top of FIG. 2. The structure at this end, as will be understood, lies outside the path of the revolving mold halves of the wheel spokes as described in connection with FIG. 1. The parison head 42 fixed in the relative position indicated by FIG. 1, is there supported on the end of an extruder barrel connector diagrammatically shown at 44 in FIG. 2. The inlet passage of the head 42 is a single passage 46 (FIG. 3). Passage 46 has a divided outlet to supply the pair of duplicate die chambers, one of such divided passages and a chamber being shown at 48 and 50, respectively.

Also diagrammatically indicated in FIG. 2 and lying outside the path of the revolving wheel elements is an upwardly angled support bracket 52 extending laterally from the barrel connection assembly to which it is anchored. On the outer end of this bracket a programming control actuator 54 is carried representing the source of power for the actuating mechanism. The output shaft 56 of actuator 54 is horizontally disposed as indicated in FIG. 3. Any suitable known control apparatus designed for moving shaft 56 back and forth may be used as the source for the actuating mechanism. The assembly shown by FIGS. 2 and 3 has been designed as particularly suitable for receiving the output of a single programming means operating in accordance with apparatus covered by prior U.S. Pat. No. 3,538,548 granted Nov. 10, 1970. Shaft 56 as shown is pivotally connected at its outer end to a forked end 58 of a link or crank arm 60 of a driver rod, the crank arm comprising the input end of the new unit as will be described below.

The double parison die block 42 itself and parts thereof forming the annular die cavity as in the chamber 50 (FIG. 3) is herein shown as representative of such a die block and having as a characteristic feature the vertical die cores 62 extending from the top wall thereof. It will also be understood that cores 62 may further be provided with a central bore from top to bottom as is common in the art to supply air under pressure and prevent the extruded parison tubes from collapsing. A mandrel 64 typically supports the die core 62 for vertical movement, the die core being fitted at its lower end with a mandrel tip 66 disposed centrally of the outlet orifice 68. Tip 66 is raised and lowered relative to outlet 68 and may thus vary the wall thickness of a parison tube, as is well known. The die shell 70 in which the outlet orifice 68 is formed and the fittings for holding the same in place at the underside of the block, as well as the assembly fittings generally indicated by numeral 72 at the top of the block and through which the core 62 extends form no part of the present invention and need not be further described.

In FIG. 2 the spaced relation of the die cores 62 and 62' is clearly evident with the tip of core 62' lying behind core 62 as viewed from the input end of the block. A movable mold half 26 and fixed half 28 are shown in spaced relation at opposite sides of the cores, duplicate mold cavity portions also being indicated at 27 in half 26. The halves are brought together below the cores 62 and 62' to load the mold.

On the top wall of head 42 a driven section of the assembly is rotatably mounted, the driven section being formed as a tubular shaft member 80. Tube 80 is rotatably supported by a center bearing 82 and end bearings 84. Each bearing as shown is mounted in a pillow block bolted on the top wall of the head. It will be noted the axial center of each die core member is centrally located between the center bearing 82 and the adjacent end bearing 84. The shaft is held in position between the end bearings as by a shouldered engagement as at 86 of a reduced end portion of the shaft abutting the flanged sleeve of bearing 84. Thus the shaft is positionally engaged and supported on a horizontal axis disposed in laterally adjacent parallel relation to a vertical plane connecting the axial center lines of the cores 26 and 26' and in which such center lines are disposed.

Figure 5:
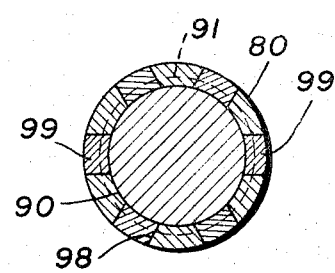

Fixed internally of the tube 80 is the driver section, as the rod 90, of the composite shaft assembly. Rod 90 is attached to a central zone of tube 80, such central zone being substantially enclosed by the supporting center bearing 82. Shaft 80 along its central attachment zone is furthermore of a reduced inner diameter forming a shoulder as at 91 (FIG. 5). Thus rod 90 extending axially into the tube and having an outside diameter slidably fitting the reduced center zone for attachment thereto, lies in spaced relation to the inner tube wall.

Rod 90 extends outwardly of end bearing 84 and on an extension 92 of the top wall of the block is journaled in a roller bearing 94 of a pillow block 96 bolted on the extension 92. Bearing 94 supports rod 90 in axial alignment with the tube shaft 80. The crank arm 60 pivotally connected to the shaft 56 as previously mentioned is fixed to rod 90 outwardly of bearing 94.

Figure 4:
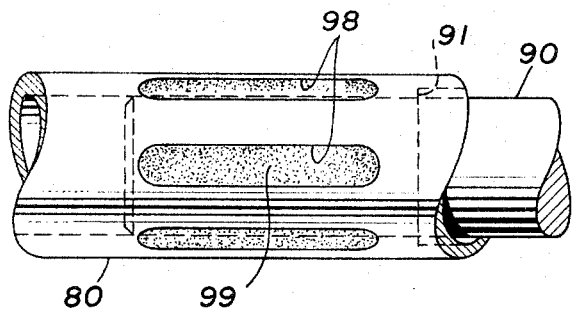
FIGS. 4 and 5 are fragmentary detailed views showing the integral attachment of the driven tubular shaft and driver rod sections of the assembly.

In FIGS. 4 and 5 a preferred method of rigidly anchoring the outer end of rod 90 in the central attachment area of the tube 80 is shown. A plurality of circumferentially spaced longitudinally extending slots at 98 are cut through the wall of the tube. When the end portion of rod 90 is inserted in position it is welded to the tube through the slots, the welding material 99 filling the slots and integrally bonding the sections together evenly. As may be noted from FIG. 2 the longitudinal weld slots of the tube are centered with respect to the die core members 62 and 62'.

At each side of center bearing 82 pairs of spaced lever arms 100 are provided as rocker elements. The arms are fixed on the tube as by welding and each pair extends laterally to straddle one of the cores between its outer ends. Shoes 102 are pivotally mounted in facing relation between the ends of the arms for rotation on axially aligned pins 104 fixed in said ends and the common horizontal axis of the pins is normal to and in substantially intersecting relationship with the vertical axes of core members 62 and 62'. The shoes 102, as shown, are rectangular in form and ride in horizontally grooved tracks 106 cut in the opposing faces of a lifter block 108 fixed on the exposed stems of the core members. The lifter blocks are positionally anchored on the cores as by seating on a shouldered portion and there held as by a nut 110 threaded against the top of the block 108.

It will be appreciated from the description of the embodiment of the apparatus shown by the drawings that the head-space requirements of a double parison extrusion die block equipped with die core control apparatus may be maintained at a minimum and comparable to that required by a similarly equipped single parison head. "Identical twin" parison tubes may thus be produced in wheel-type molding machinery originally designed for single parison production without altering the basic design thereof because of increased head space needs. The low profile of the composite shaft assembly as herein disclosed makes this possible. The forces applied to each of the die core members to raise and lower the same are equalized by a "centered" attachment of the driver rod section 90 in the driven tube section 80. An equal loss of motion by deflection at the axial centers of the core members 62 and 62' is provided although the original actuating force motion is applied at one end of the composite shaft member. Thus a precisely identical vertical movement may be applied to each of the die cores to insure a resultant identity of the simultaneously formed parison tubes.

What is claimed is:

1. A double parison extrusion die head having a pair of spaced, vertically movable, die core members extending from the upper surface thereof and operable to vary the wall thickness of parison tubes extruded from said head, and torque equalizing mechanism for actuating said die cores, said actuating mechanism comprising a composite shaft member having a driven section mounted on the top of said head for rotational movement on a horizontal axis normal to the core axes and in laterally adjacent parallel relation to a vertical plane joining and including the axial center lines of said spaced core members, and a driver section rigidly fixed at one end to a central attachment zone of the driven section in equally spaced relation to each of said die core center lines, said driver section at its other end extending axially outwardly of the driven section and being supported for rotational movement on the axis of the driven section, said other end having means engageable for imparting a rotational rocking movement to said driver section, said driven shaft section having rocker elements extending therefrom at equally spaced positions relative to said central attachment zone, the outer ends of said rocker elements being interconnected with the upper ends of said die core members and engaged therewith for uniformly raising and lowering the latter in response to rocking movement imparted to said driven section, said central attachment zone comprising the sole area of torque transfer between said driven section and said driver section.

2. Double parison die head and core actuating mechanism according to claim 1, in which, said driven section is a tubular shaft section and said driver section is a rod section extending into the tubular section and integrally joined therewith along said central attachment zone.

3. Double parison die head and core actuating mechanism according to claim 2, in which, said rocker elements comprise lever arms fixed on said tubular shaft section, the outer ends of said arms having pivotal connecting means interengaged with the die core members for uniformly raising and lowering the same, and said means for imparting rocking movement to the driver section is a crank arm extending radially from the outer end of said rod.

4. Double parison die head and core actuating mechanism according to claim 3, in which, said tubular shaft section is mounted in a center bearing substantially embracing said central attachment zone and in end bearings, and a bearing inwardly of said radial crank arm rotatably supports the outer end of said rod section in axial alignment with said tubular section.

5. Double parison die head and core actuating mechanism according to claim 3, in which, the rocker elements engaging each die core member comprise a pair of spaced lever arms fixed on said tubular shaft section, each pair of arms is provided at their outer ends with oppositely facing pivotally mounted shoes and said core members are provided with horizontally grooved tracking means at opposite sides thereof receiving said shoes for sliding movement therein and identical vertical movement of the core members when said arms are pivotally moved by said tubular shaft section.

* * * * *